(12) United States Patent
Brown

(10) Patent No.: US 6,666,563 B2
(45) Date of Patent: Dec. 23, 2003

(54) ILLUMINATION DEVICE

(76) Inventor: Dahvid N. Brown, 3636 Northshore Rd., Columbia, SC (US) 29206

( * ) Notice: Subject to any disclaimer, the term of this patent is extended or adjusted under 35 U.S.C. 154(b) by 0 days.

(21) Appl. No.: 10/120,561

(22) Filed: Apr. 12, 2002

(65) Prior Publication Data

US 2003/0193795 A1 Oct. 16, 2003

(51) Int. Cl.[7] .................................................. F21V 9/16
(52) U.S. Cl. ..................... 362/84; 362/190; 362/191; 362/198; 362/98; 362/99; 362/555
(58) Field of Search ..................... 362/84, 190, 191, 362/198, 103, 189, 582, 98, 99, 555, 577

(56) References Cited

U.S. PATENT DOCUMENTS

| | | | |
|---|---|---|---|
| 4,581,684 A | 4/1986 | Mazzuco | |
| 4,885,663 A | * 12/1989 | Parker | ........................ 362/561 |
| 5,013,967 A | * 5/1991 | Hirotaka et al. | ............ 313/512 |
| 5,345,531 A | 9/1994 | Keplinger et al. | |
| 5,442,528 A | 8/1995 | Vandenbelt | |
| 5,568,964 A | 10/1996 | Parker et al. | |
| 5,695,271 A | * 12/1997 | Zeller | ........................ 362/98 |
| 5,884,888 A | 3/1999 | Grimes, III et al. | |
| 5,921,652 A | 7/1999 | Parker et al. | |
| 6,022,119 A | 2/2000 | Booty, Jr. | |
| 6,079,838 A | 6/2000 | Parker et al. | |
| D427,703 S | 7/2000 | Chan | |
| D428,177 S | 7/2000 | Chan | |
| D435,677 S | 12/2000 | Hollinger | |
| 6,170,958 B1 | 1/2001 | Chien | |
| D438,653 S | 3/2001 | Ljungstrom | |
| 6,283,604 B1 | 9/2001 | Liao | |
| 6,290,368 B1 | 9/2001 | Lehrer | |
| 6,296,383 B1 | 10/2001 | Henningsen | |

* cited by examiner

Primary Examiner—Stephen Husar
Assistant Examiner—Guiyoung Lee
(74) Attorney, Agent, or Firm—Oliff & Berridge, PLC

(57) ABSTRACT

An illumination device has a base portion, a neck portion attached to the base portion, a power source and an illumination panel has an electroluminescent light source or a light guide that produces a diffuse light. The illumination panel may have roughly the thickness of a credit card and may be positioned via the flexible neck portion. The illumination device is particularly suited for use as a book light or task light due to its uniform, diffuse light, and compact size.

29 Claims, 13 Drawing Sheets

ILLUMINATION DEVICE

BACKGROUND OF THE INVENTION

1. Field of Invention

This invention relates to an illumination device usable to produce a diffuse light.

2. Description of Related Art

The use of illumination devices such as book lights or general purpose task lights are well-known in the art. Typically, these devices may include a base, a neck portion and a light emitting portion emitting light in a desired direction. These devices may be used in situations where overall illumination of a room or environment is unnecessary or unwanted. These devices may also be used where a particular object or area requires additional or more intense illumination than the surrounding area. For instance, the pages of a book or a work area.

These devices may typically use incandescent or fluorescent light sources. Both of these sources suffer from a variety of problems. For example, incandescent lights may be fragile, have a relatively short lifespan, use a great deal of power and generate considerable heat that is capable of burning skin, upholstery and possibly creating a fire hazard. Incandescent lights are also susceptible to vibration and use a great deal of battery power, thus adversely affecting battery life. Further, current illumination devices such as book or task lights produce a light that is harsh on the user's eyes, with a very bright illuminated spot at the center of the illuminated area which fades in intensity towards the periphery of the illuminated area. In some cases, if adequate shielding or shading is not provided from the bulb, the light may be blinding to the user.

While traditional fluorescent lights may tend to be cooler than incandescent lights they are fragile and are typically too large and bulky for smaller applications. Additionally, some fluorescent lights may also have hot areas at their terminal ends and at their inverters. Traditional fluorescent lights also tend to produce a flickering illumination as they age, causing a distraction to the user.

SUMMARY OF THE INVENTION

The illumination device of this invention produces a diffuse light by making use of an illumination panel. This illumination panel may utilize either a light guide or an electroluminescent (EL) source. This device may be either portable or stationary. In various exemplary embodiments of this invention the illumination panel may be rectangular in shape and have roughly the thickness of a credit card. However, it should be appreciated that the illumination panel according to this invention may be of any shape, size or thickness. For example, the illumination panel of this invention may have a thickness roughly equivalent to that of a sheet of paper.

An illumination panel having these characteristics provides several advantages over illumination devices of the prior art. For example, unlike incandescent or fluorescent lights that emit light from a relatively small area or point source, an illumination panel having a substantial area provides illumination in a more uniform fashion over a given area with low glare. A thin flat illumination panel allows the device of this invention to also be used as a book mark. A thin flat illumination panel also facilitates easy storage, decreases the overall weight of the device and may be more aesthetically pleasing to the eye. This may provide a particular advantage, for instance, to a book light or task light that is portable. As a lightweight task light or book light the illumination device can be easily positioned or fixed to an object such as a book, shirt pocket, computer, clip board; or work surface, etc. While the features of the illumination device may be small or compact in size, the same features may be applicable to lights of larger size and greater weight.

The term "light guide" refers to a device that receives light at an input end and propagates the light to an output end or side without significant losses. In general, light guides operate on the principle of internal reflection, whereby traveling light is reflected on the internal surfaces of the guide. The light emitting region of the light guide may either be at a distal end or at any point along its path based on the construction of the guide. Light may be extracted along its length prior to reaching the distal end by surface treatments such as chemical or mechanical abrasion, or the use of other internal materials to reflect light out of the guide. Light may also be extracted by bending the guide itself. Light guides may be illuminated by a variety of bulb types, as well as single bulbs, multiple bulbs or an array of bulbs. Examples of light guides include but are not limited to fiberoptic panels, which "leak" light due to a tight weave or surface alteration of the fibers, or formed polymer panels such as acrylic, with reflective surfaces. The light guides may also be solid or hollow in configuration. It should be appreciated that the device of this invention may utilize any type of light guide now known or known in the future.

Electroluminescent panels are self-contained devices that produce light upon the electrical stimulation of chemicals, for example phosphor. Due to the method of lighting, the illumination panel dimensions may be made very thin, for example, approximately the thickness of a sheet of paper. Compared to traditional incandescent or fluorescent light sources, electroluminescent panels provide the advantages of a more diffuse light, a smaller power requirement, lighter weight and ease of storage.

In various exemplary embodiments, the illumination panel of the device of this invention may be of any shape or curvature. The panel may be composed of either a light guide terminating in a panel or an electroluminescent panel. In other exemplary embodiments more than one panel may be used on a given light assembly. In still other exemplary embodiments, mirrored or reflective surfaces may be used to minimize light loss. Colored filters or lenses may also be included in other exemplary embodiments as a permanent or removable part of the assembly. The panel of this invention may also be used with traditional point or small area light sources.

These and other features and advantages of this invention are described in or are apparent from the following detailed description of the preferred embodiments.

BRIEF DESCRIPTION OF THE DRAWINGS

Various exemplary embodiments of the invention will be described with reference to the following drawings, in which like elements are labeled with like numbers and in which.

DETAILED DESCRIPTION OF PREFERRED EMBODIMENTS

Figure 1:
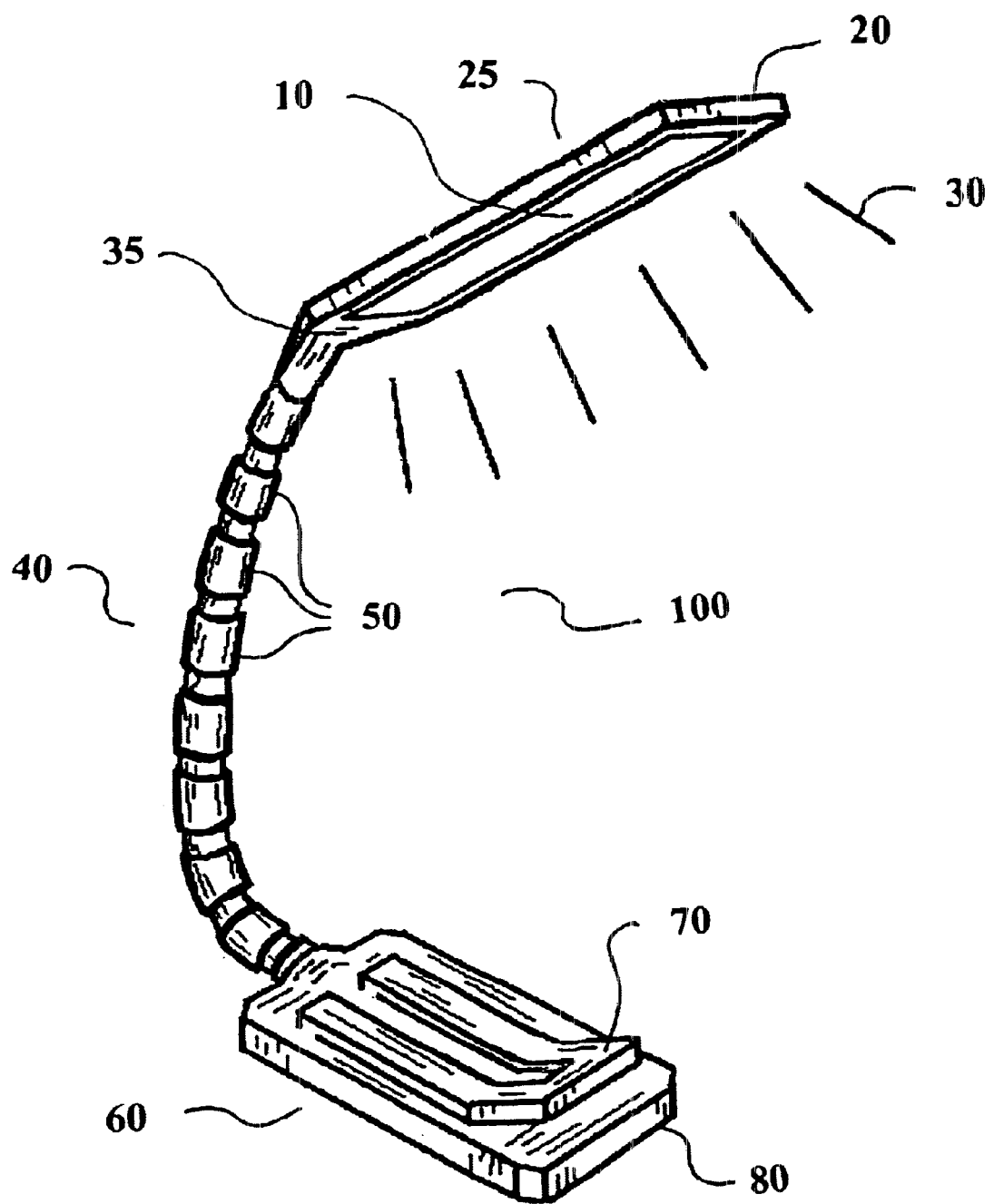
FIG. 1 shows an exemplary embodiment of an illumination device of this invention having an illumination panel, neck and base with clip.

FIG. 1 shows a first exemplary embodiment of an illumination device 100 according to this invention. As shown in FIG. 1, the illumination device 100 includes a base portion 60 having a lower section 80 with upper clip 70. The base portion 60 is connected to a neck portion 40 comprised of adjustably interconnected individual members 50 which allow the neck portion 40 to have a degree of flexibility. Alternately, the neck portion may be integrally formed, with various sections 50 being flexibly repositionable in multiple portions. The neck portion 40 is connected to the illumination panel 25 via a panel base 35. The illumination panel 25 has a frame 20 and an illumination source 10. The illumination source may be either a light guide or an electroluminescent source capable of producing a diffuse light 30. The illumination source may also be an organic light emitting diode capable of using both an AC or DC power source. The illumination device of this exemplary embodiment may be usable as a book light or task light and mountable to a surface, such as a book binding, via the upper clip 70 located on the base portion 60. It should also be appreciated that other items such as clocks, calculators, sound recorders and the like may also be added to the device of this invention.

The illumination panel 25 is not limited to the rectangular shape as shown, but may assume any shape or size. The illumination panel 25 may be of varying thicknesses, but owing to its particular illumination source, is preferably thin to reduce size and weight, for instance that of a credit card. The thickness of the illumination panel may range from about 1 millimeter to about 10 millimeters. The neck portion 40 allows for the easy adjustment and locating of the illumination panel 25. The base portion 60 may house a power source such as one or more small batteries, or may house the light source if a light guide is used for the illumination source 10. Additionally, the base portion 60 may house a plug for an external power source, an inverter if an electroluminescent light is used and any necessary circuit components. Possible external power sources could be a battery pack, or the device could use regular voltage through a transformer, from a computer COM or USB port, or the like. While these items can be stored in the base portion of the device it may also be possible to store them at any location within the device of this invention. Switches for activating the device may be located anywhere in the device, or on the external power source. In addition, the device may be self actuated when opened or closed. The base portion 60 may also provide a stable platform in the event that the upper clip 70 is not used for attaching the illumination device to an object such as a book or shirt pocket.

The illumination source 10 produces a diffuse light and may be of any shape or curvature. Additionally, more than one illumination source 10 may be used in conjunction with the illumination panel 25. Mirrored or reflective surfaces may also be used to minimize light loss and colored filters or lenses may be provided as a permanent or removable part of the assembly.

In the event a light guide is used as the illumination source 10, the illumination panel 25 may house fiberoptic strands either woven or chemically or mechanically altered in such a way that light is lost along their length before reaching their terminated ends. Further, the illumination panel 25 may be a solid form body, such as molded polymer with reflective surfaces. The loss of light allows a diffuse light to be emitted from the illumination source 10. The ultimate light source of the illumination panel 25 may be comprised of light emitting diodes, halogen lamps, neon lamps, fluorescent lamps, vacuum lamps, electroluminescent diodes or regular incandescent lamps. The illumination panel 25 may have multiple layers and the light source or sources may be fed from either one or multiple ends with one or more bulbs, or an array of bulbs. A preferred light source is a white or near-white LED. The LED has advantages of low heat emission, small size, low power consumption, and long life.

In various exemplary embodiments, different levels of brightness may be achieved by allowing the user the ability to control the number of bulbs functioning at a given time or by using bulbs with variable brightness. Further, bulbs of any color may be used with the device of this invention. The bulb may be situated in the base portion 60 with long fiberoptic bundles feeding through the neck portion 40 to the illumination panel 25. The neck portion 40 may be of any length or may be omitted altogether. In other exemplary embodiments, the light source of the light guide may be located on the bottom of or behind the illumination panel 25, or in the neck portion 40. Still in other exemplary embodiments, the illumination panel 25 may be removable so that the bulb may be used for direct illumination without the light guide. In various exemplary embodiments the light source may or may not be replaceable.

In the case where an electroluminescent panel is used as the illumination source 10 the electroluminescent light may be of any color. Electrical terminals may be located anywhere on the panel. In various exemplary embodiments, power driving schemes may be used to counter the aging characteristics of the electroluminescent light source by altering the driving voltage to compensate for loss of brightness over time. Frequency and voltage may also be controlled in order to control the level of brightness in the device. In various exemplary embodiments the electroluminescent light panel may or may not be replaceable.

Figure 2:
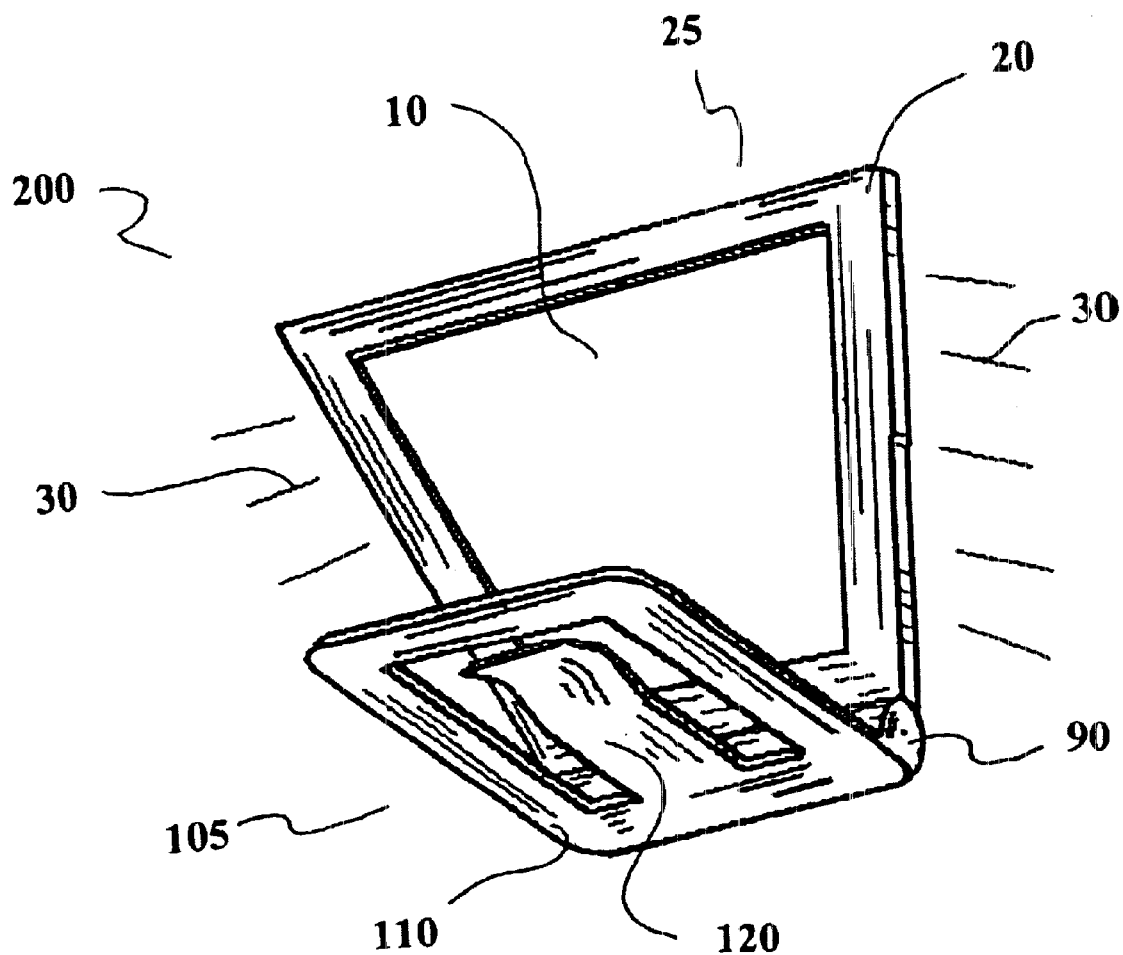
FIG. 2 is another exemplary embodiment of an illumination device of this invention having a base clip attached directly to the illumination panel.

FIG. 2 shows another exemplary embodiment of the illumination device 200 of this invention. The base portion 105 has an upper clip 110 and a lower clip 120 which act in concert to allow the device to be attached to a variety of different surfaces, such as a book, workplace, or shirt pocket. The base portion 105 is attached to the illumination panel 25 via hinged portion 90, which serves as a flexible neck portion. The illumination panel 25 includes a frame 20 and an illumination source 10 which may have a light guide or an electroluminescent light to produce a diffuse light 30. The hinged portion 90 allows the base portion 105 to be folded against the illumination panel 25 for ease of storage. When the device is in use the illumination panel 25 may be folded away from the base portion 105 and clipped onto a surface, such as the pages or cover of a book or shirt pocket.

Figure 3:
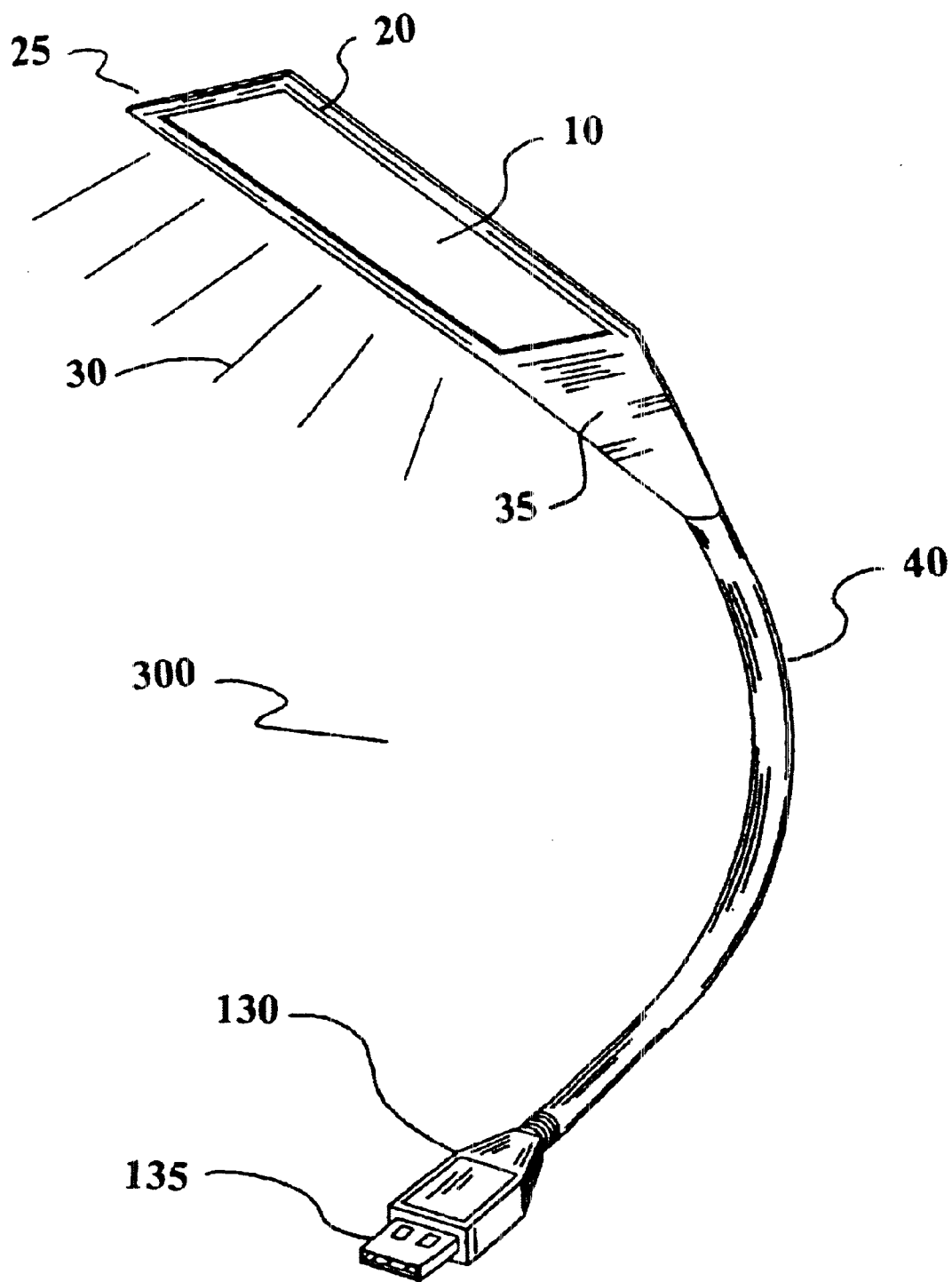
FIG. 3 is an exemplary embodiment of an illumination device of this invention having an electrical connector.

FIG. 3 is an exemplary embodiment of the illumination device 300 of this invention having a base portion 130 that includes an electrical connector 135 in the case where the device is utilizing an external power source (not shown). Electrical connector 135 may be any variety of known electrical connection devices now known or developed in the future. Electrical connector 135 as shown in FIG. 3, is a USB connector for use with a computer. The base portion 130 is connected to a flexible neck portion 40 that is ultimately attached to the illumination panel 25 via the panel base portion 35. The illumination panel 25 has an illumination source 10 and a frame 20. The illumination source 10 may be an electroluminescent light or a light guide capable of producing a diffuse light 30.

In this exemplary embodiment an external power source is utilized, thus reducing the overall weight of the device. The illumination device as shown in FIG. 3 may also be plugged into a laptop or desk top computer to illuminate a keyboard or other such device, work area, etc. An adapter may also be provided that is capable of converting a USB plug into another plug usable with the device. The flexible neck portion 40 allows the illumination panel 25 to be positioned to provide a sufficient light 30 to a desired area. Neck portion 40 has sufficient rigidity to retain its position once properly positioned by a user.

Figure 4:
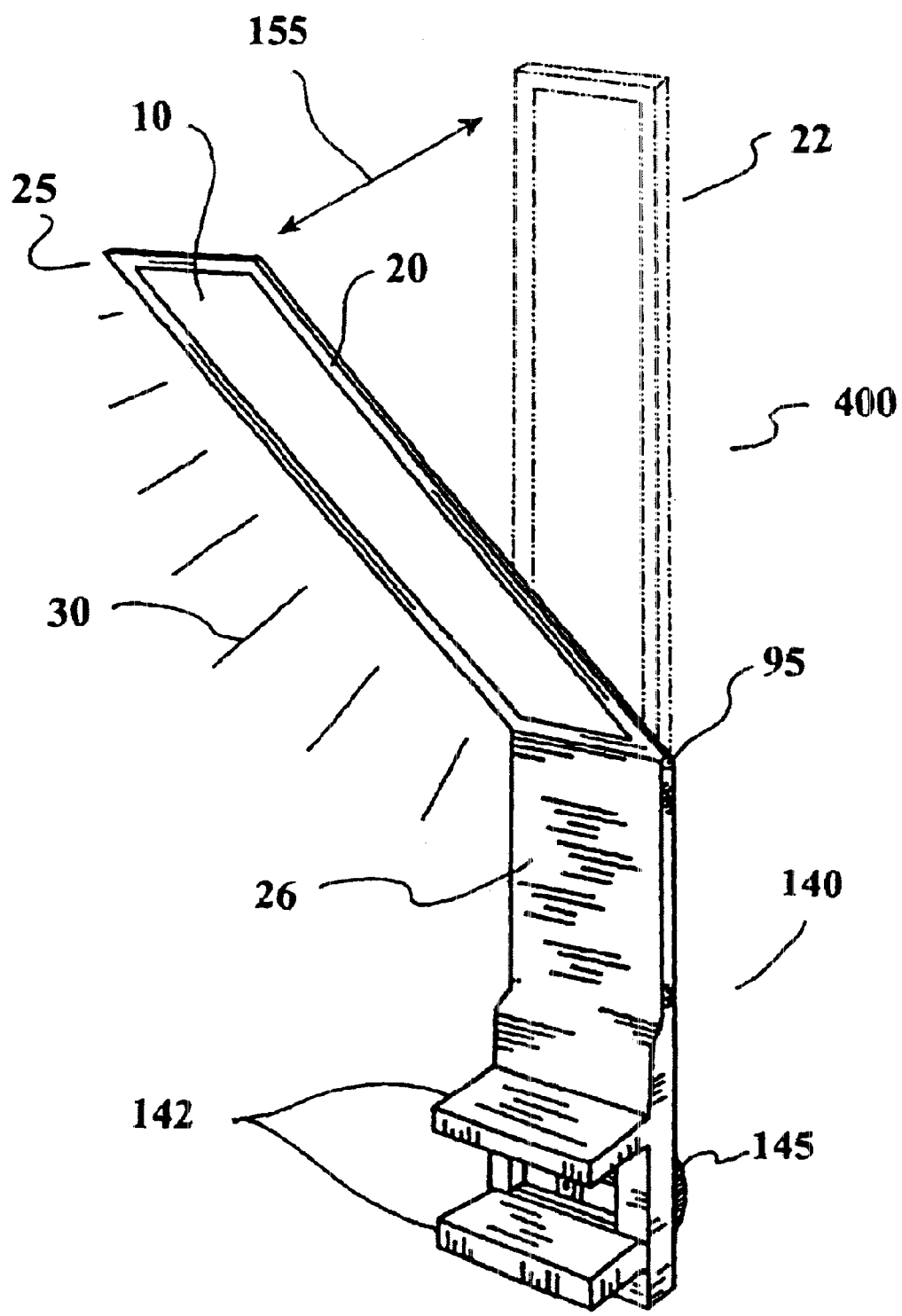
FIG. 4 shows an exemplary embodiment of an illumination device of the invention having a clamping base.

FIG. 4 is another exemplary embodiment of the illumination device 400 of this invention having a base portion 140 including adjustable clips 142 which are movable via adjusting dial 145. The clips 142 may be moved towards or away from each other to facilitate clamping of the base portion 140 onto a surface, such as a table top, counter, desk, computer, bed headrest, etc. Illumination panel 25 is attached to the base portion 140 via the upper base portion 26 (neck portion) having a hinged member 95. The hinged member 95 allows for the illumination panel 25 to be rotated into the desired position to allow a diffuse light 30 to be directed towards a desired area or for storage.

As shown in FIG. 4, the illumination panel 25 may be moved from an upright position 22 in the directions indicated by arrow 155. However, in other exemplary embodiments the illumination panel 25 may be rotated in excess of 2700 such that an area on both sides of the device may be illuminated. In still other exemplary embodiments the base portion 140 having clips 142 may be used in conjunction with a flexible neck portion to adjustably position the illumination panel 25, as shown in previous FIGS. 1–3.

Figure 5:
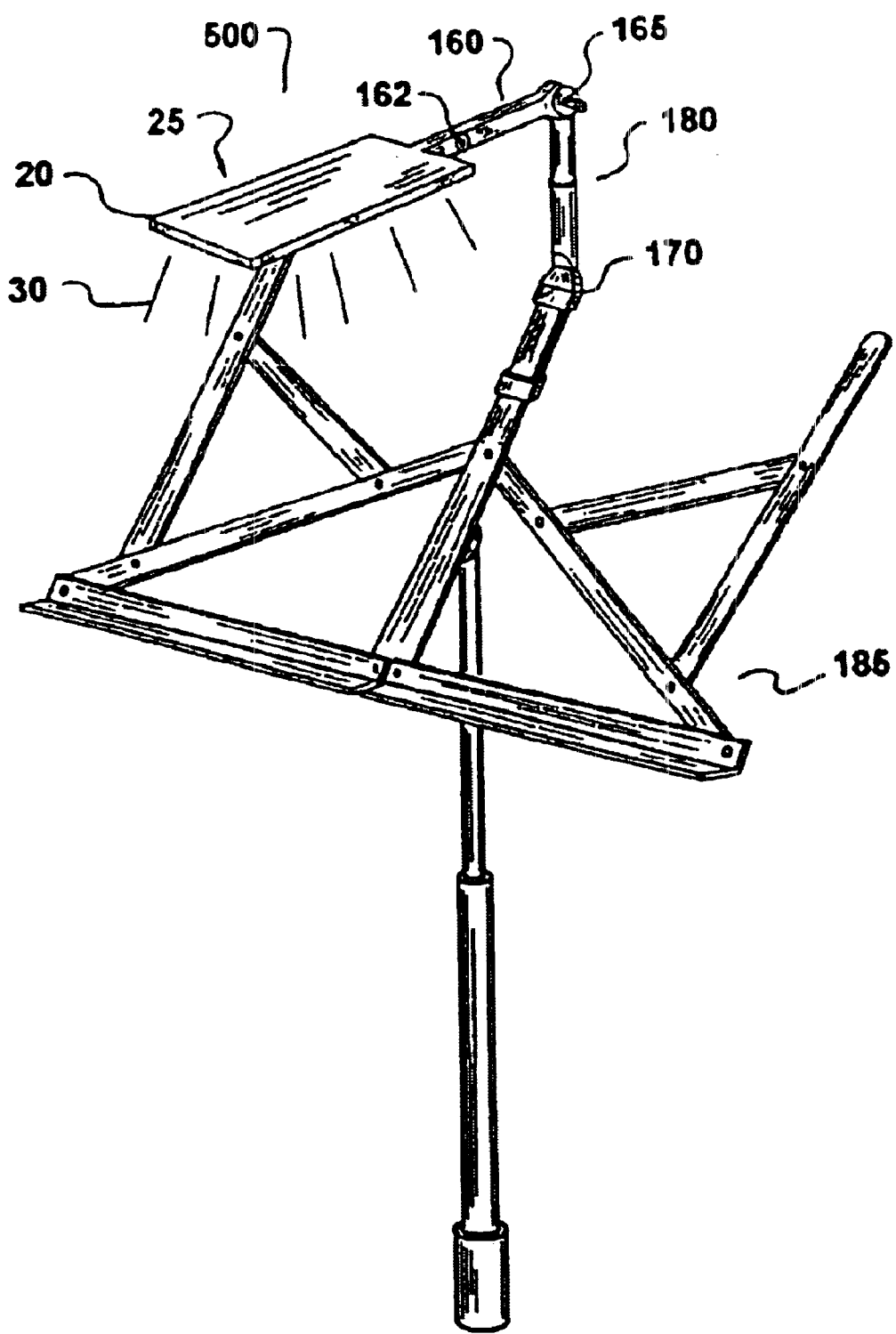
FIG. 5 shows an exemplary embodiment of an illumination device of this invention having a base adapted for use with a music stand.

FIG. 5 is another exemplary embodiment of the illumination device 500 of this invention adapted for use with a music stand 185. In this exemplary embodiment, the illumination device 500 has a modified base portion 170 for connection to the music stand 185. The base portion 170 is connected to telescoping neck portion 180 having a hinged member 165. The illumination panel 25 is connected to the hinged member 165 by a rigid second neck portion 160. The rigid second neck portion 160 also includes a hinged member 162 to facilitate further positioning of the illumination panel 25. In this embodiment the illumination panel 25 may be adjusted to properly illuminate sheet music or other such documents with diffuse light 30.

While the illumination device 500 as shown in FIG. 5 is adapted specifically for use with a music stand, other various exemplary embodiments of the device of this invention may be adapted for use with other rigid structures, such as a podium, chair, bookshelf, painting, book cover, clip board and the like. The power source for the illumination device 500 may be located in the base portion 170 or in any other portion of the device that provides an adequate storage volume. The power source may also be located externally as a battery pack, wall transformer plug, etc. As with all of the previous embodiments discussed, the illumination source may be either a light guide or an electroluminescent light.

Figure 6:
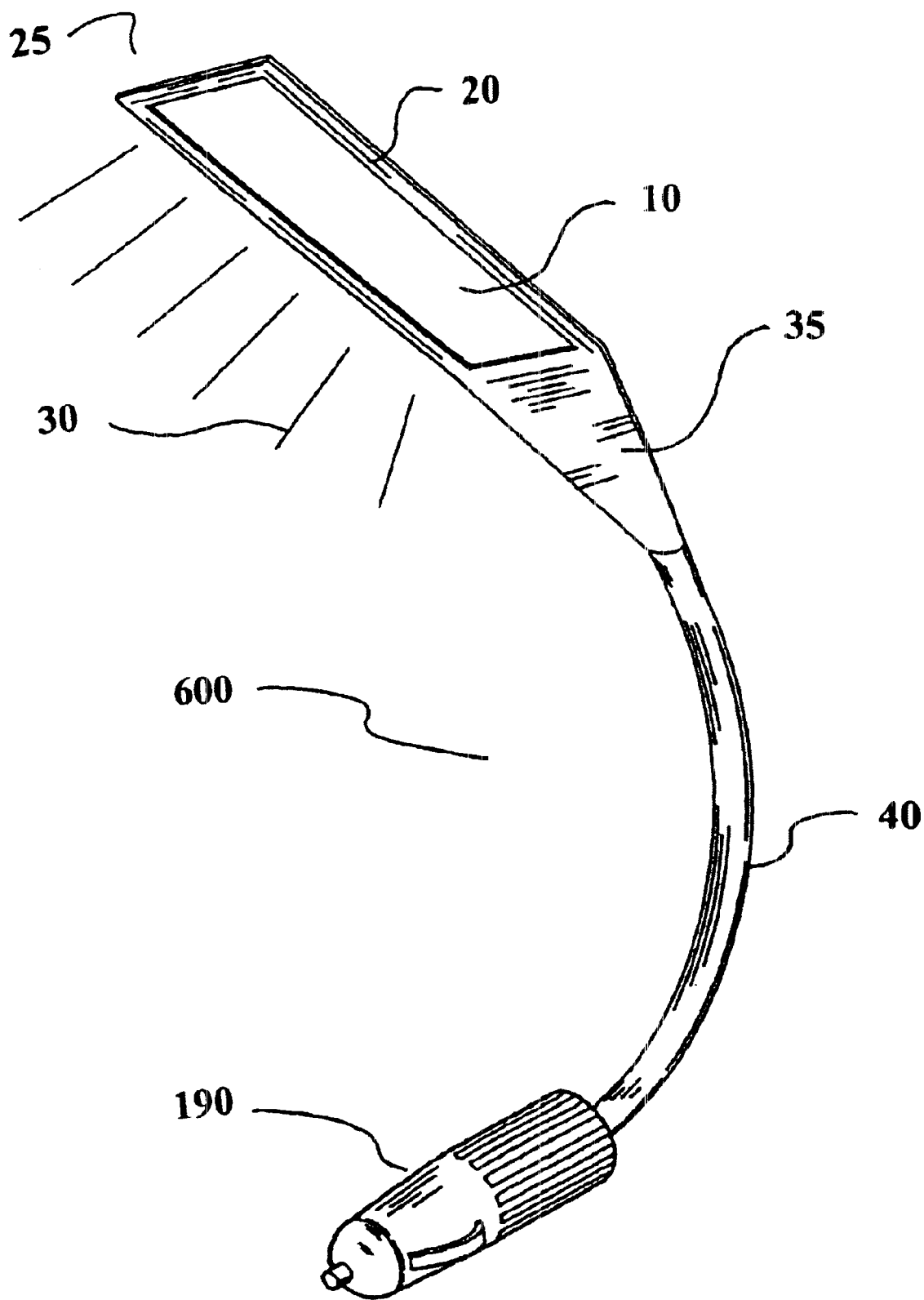
FIG. 6 is an exemplary embodiment of an illumination device of this invention having a base adapted for use with an automobile cigarette lighter.

FIG. 6 shows an exemplary embodiment of an illumination device 600 of this invention having a base portion 190 adapted for use with an automobile cigarette lighter. Because an external source of power is utilized in this exemplary embodiment, the overall weight of the device may be reduced. The base portion 190 is connected to the flexible neck portion 40 which is then connected to the illumination panel 25 via the illumination panel base portion 35. As shown in the previous embodiments, the illumination panel 25 is made up of a frame portion 20 having an illumination portion 10 which may use either a light guide or an electroluminescent light as the light source to produce a diffuse light 30. In other embodiments the frame portion 20 may be omitted from the device, leaving only the illumination portion 10 connected to the flexible neck portion 40. The panel 25 is electrically coupled to base portion 190 to provide power from the external power source to the light source.

The base portion 190 as shown in FIG. 6 has been adapted for use in an automobile cigarette lighter. As such, the illumination panel 25 may be adjusted by the neck portion 40 to facilitate a driver or passenger in an automobile with such tasks as map reading or reading in general. Because the neck portion 40 may be of variable length and is flexible to allow the illumination panel 25 to be positioned in a desired location, overhead or dome lights in the automobile are not necessary for most tasks. This may be of particular advantage to the driver as bright sources of illumination inside an automobile during night time driving can be a serious distraction.

Figure 7:
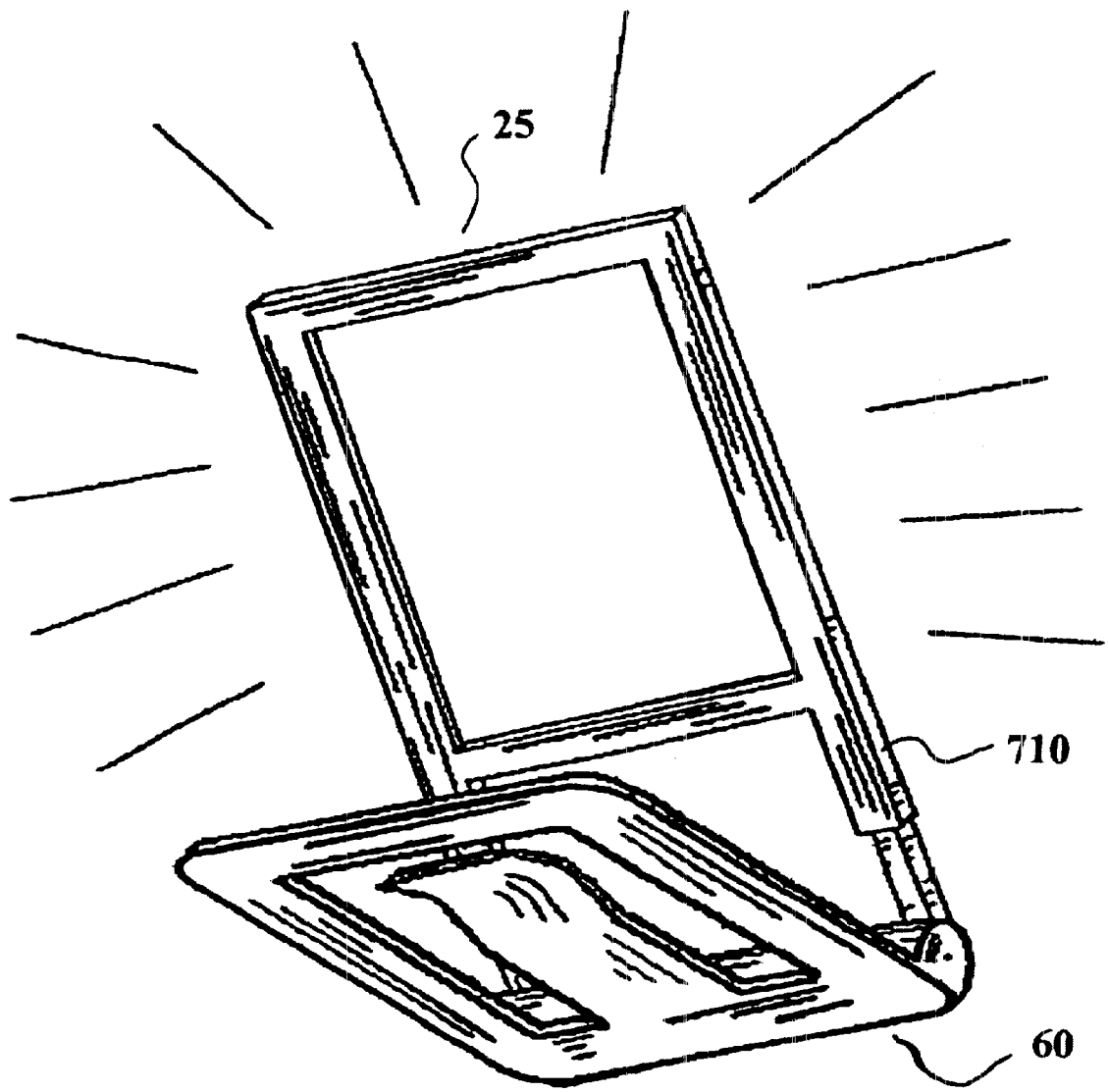
FIGS. 7–13 illustrate various additional exemplary embodiments of an illumination device of this invention.
Figure 8:
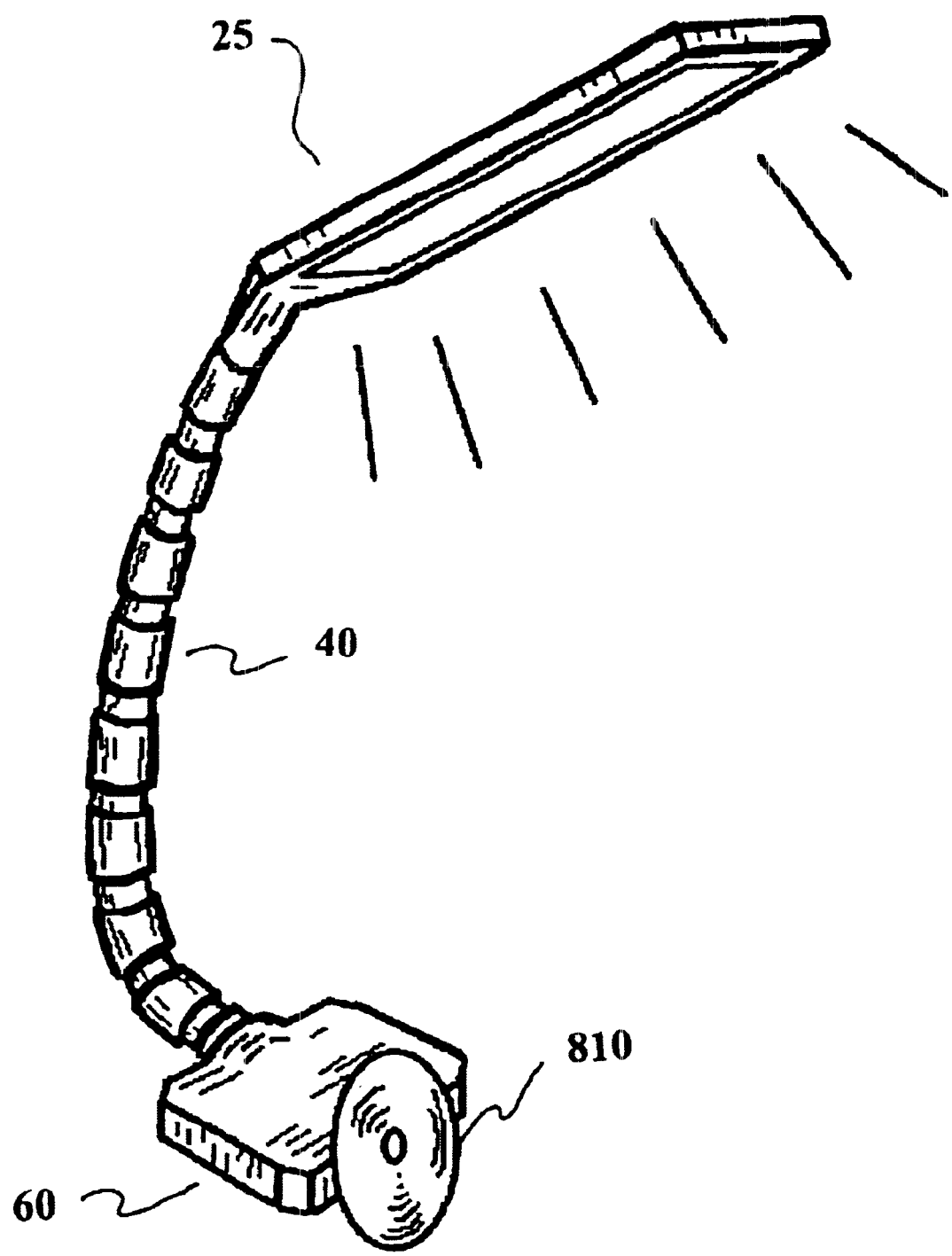
Figure 9:
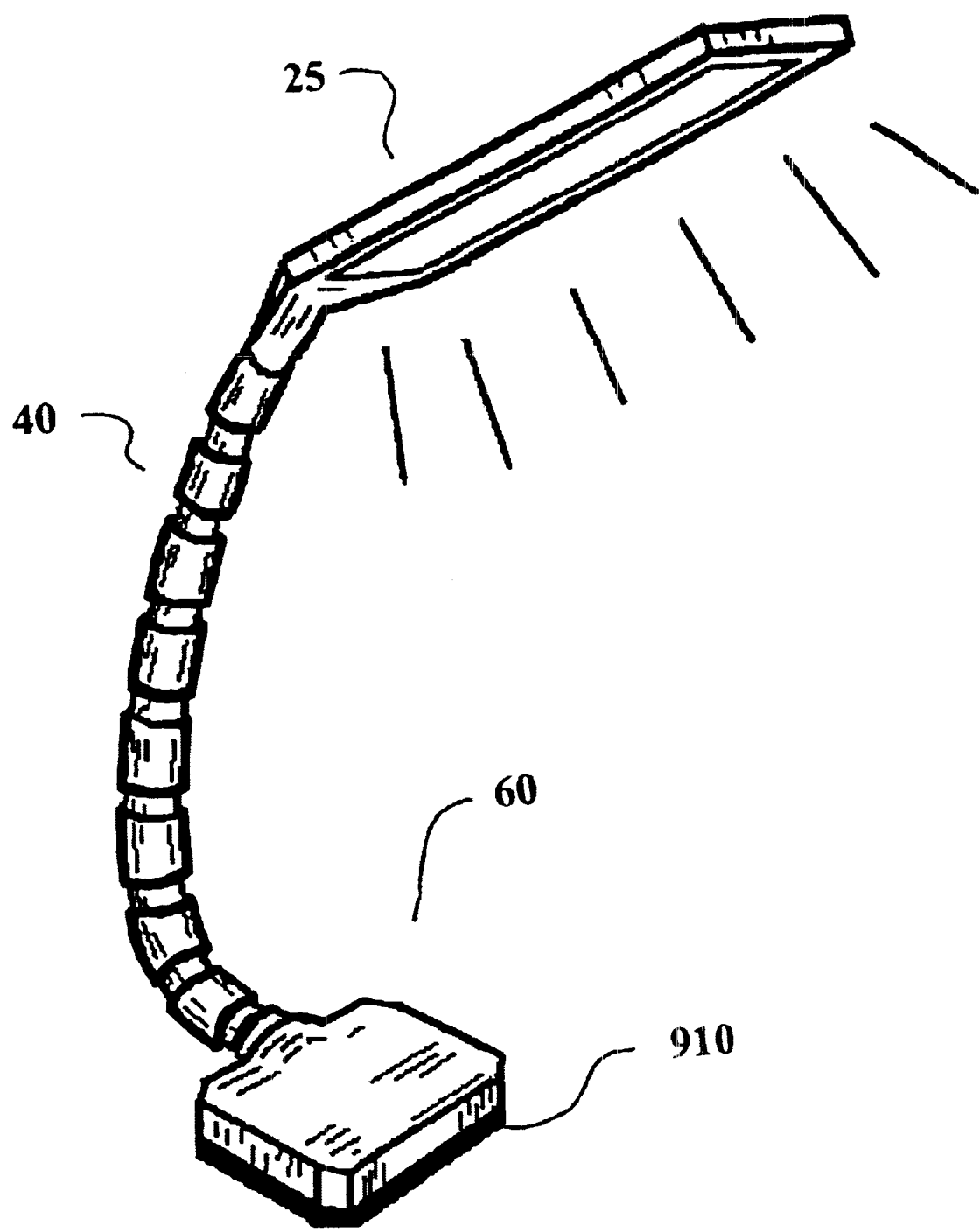
Figure 10:
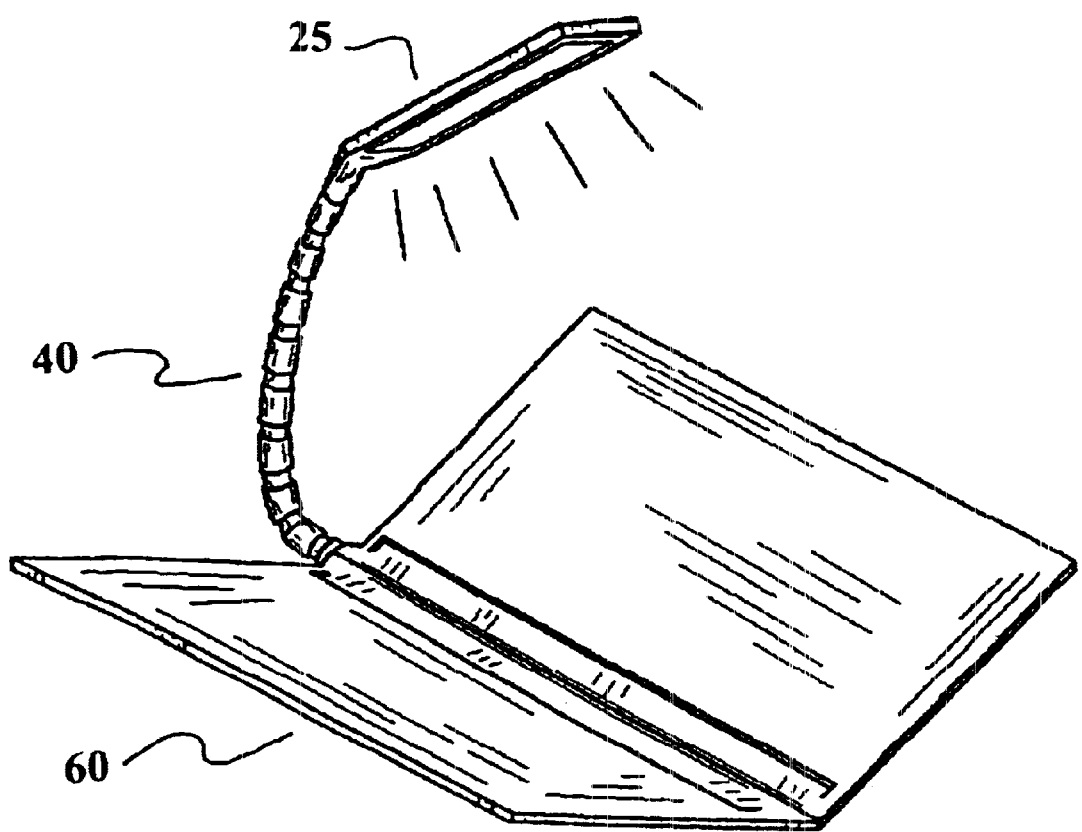
Figure 11:
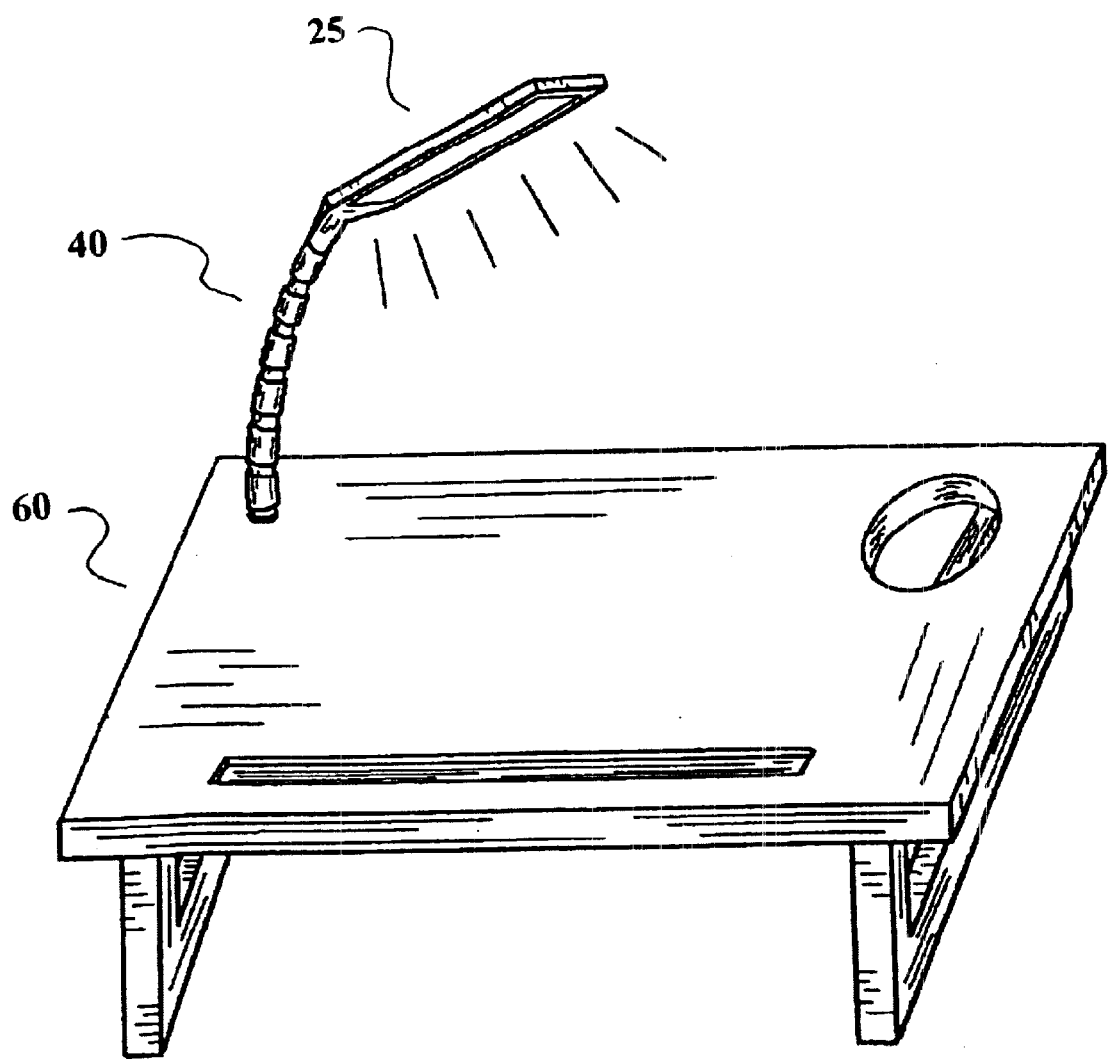
Figure 12:
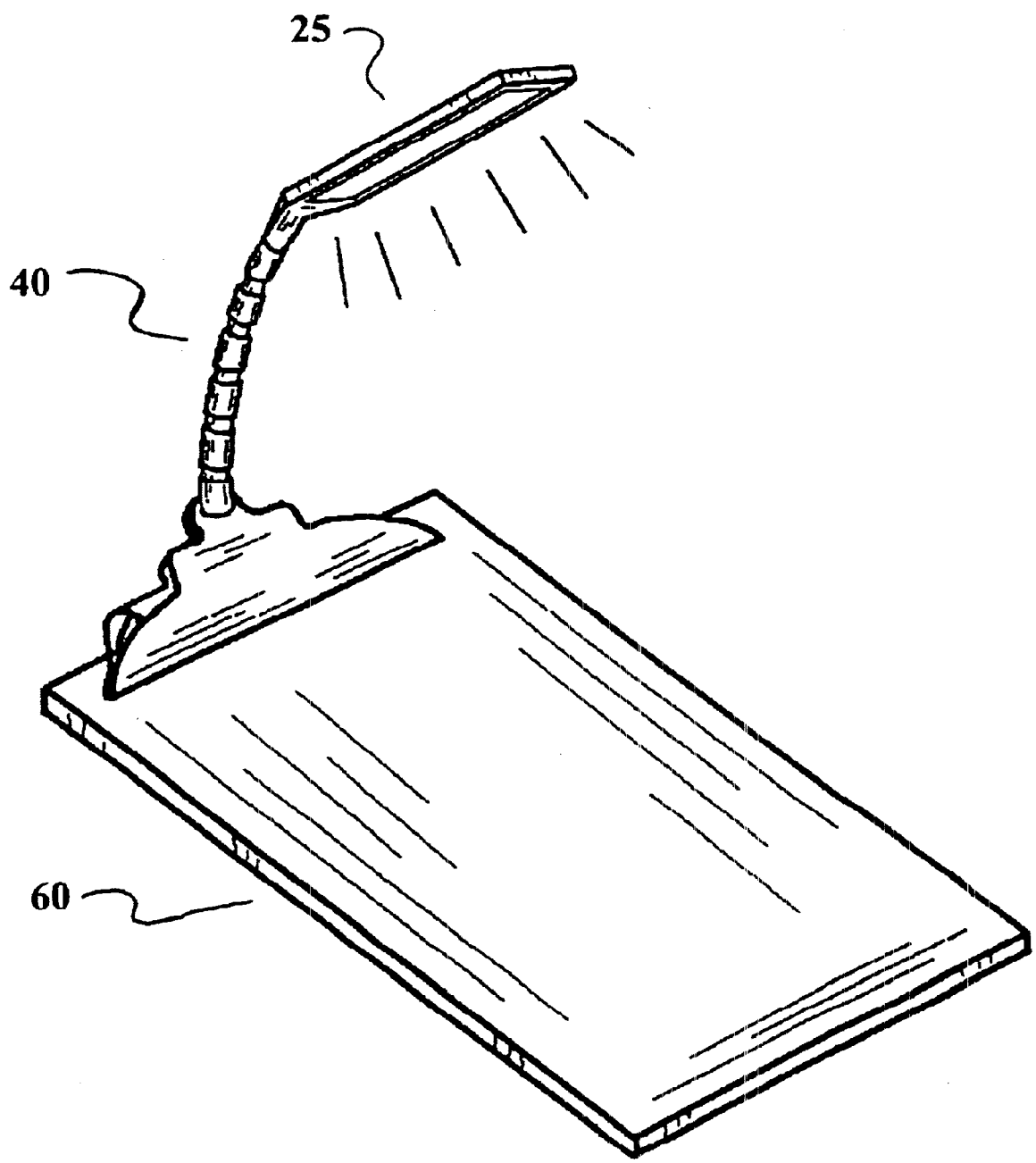
Figure 13:
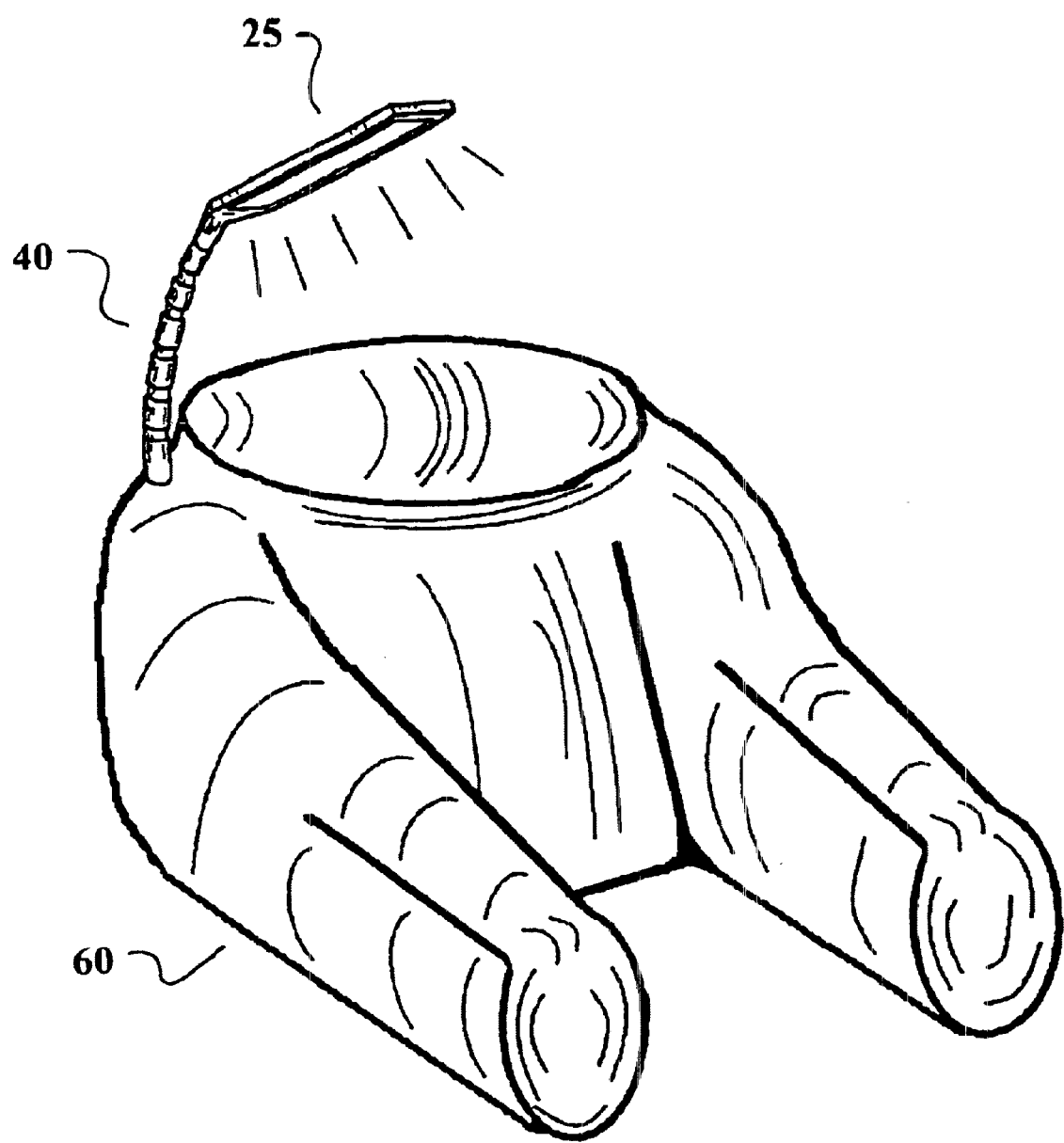

FIGS. 7–13 illustrate various exemplary embodiments of the illumination device of this invention. FIG. 7 illustrates the device of this invention having telescoping members 710 that allow the illumination panel 25 to be adjusted relative to the base portion 60. FIG. 8 illustrates the device of this invention having a suction cup 810 attached to the base portion 60 for attaching the device to various surfaces. FIG. 9 illustrates the device of this invention having a magnet 910 attached to the base portion 60. FIG. 10 illustrates the device of this invention wherein the base portion 60 is a book cover, or book dust jacket. FIG. 11 shows the device of this invention having a base portion 60 that is a workbench, table or tray table. FIG. 12 illustrates the device of this invention having a base portion 60 that is a clipboard and FIG. 13 shows the device of this invention having a base portion 60 that is a bed lounge pillow.

Figure 14:
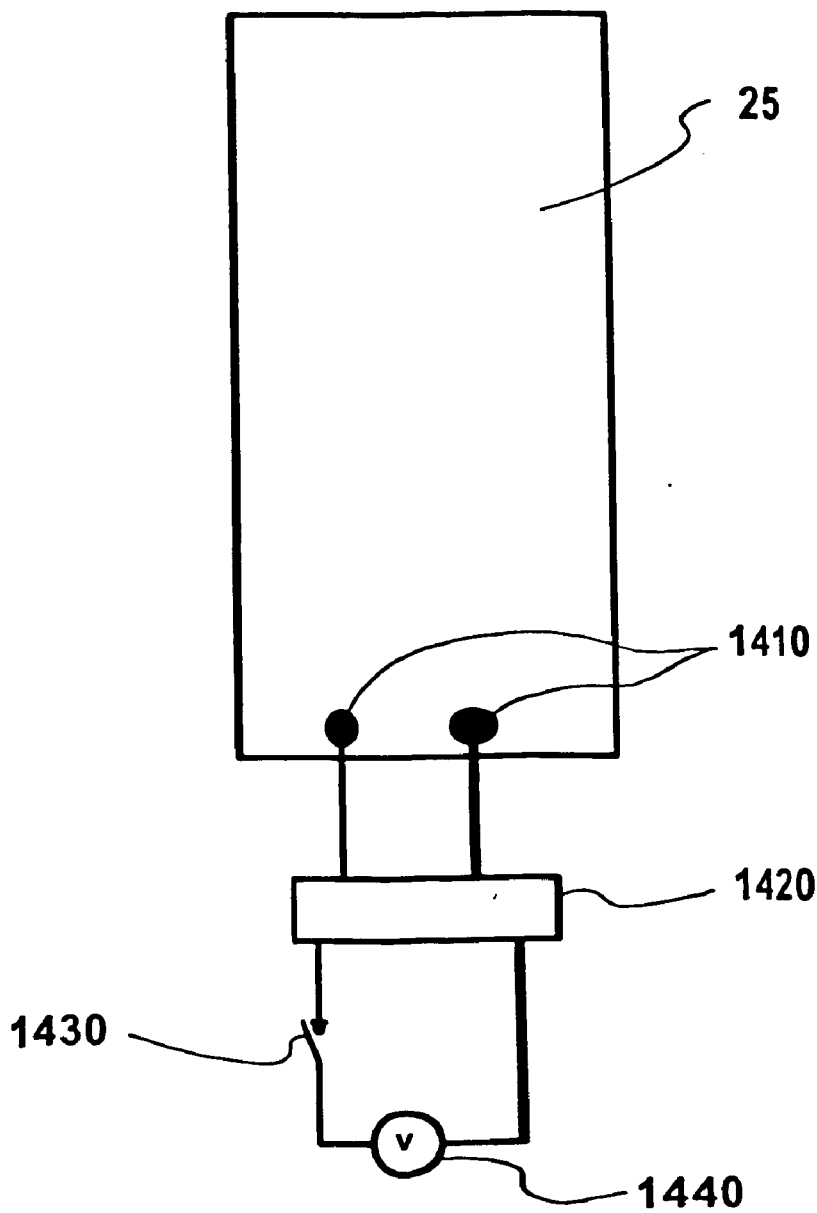
FIG. 14 is an exemplary embodiment of a circuit diagram for an illumination device of this invention.
Figure 15:
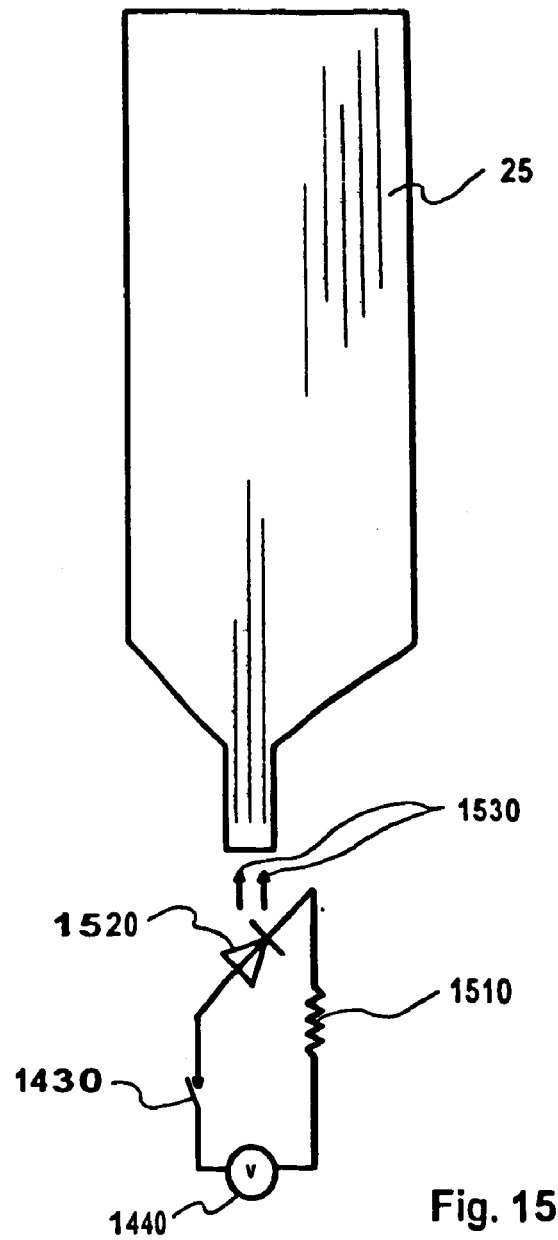
FIG. 15 is another exemplary embodiment of a circuit diagram of an illumination device of this invention.

FIG. 14 illustrates an exemplary circuit diagram for the device of this invention having an electroluminescent light source. Connectors 1410 electrically connect the panel 25 to an inverter 1420. The inverter 1420 is in turn wired to a power source 1440 and a switch 1430. FIG. 15 is also an exemplary circuit diagram for the device of this invention where the light panel is illuminated by a light guide. Light waves 1530 emitted from a light emitting diode (LED) 1520 travel to the light panel 25 to provide illumination. A power source 1440 is electrically connected to a resistor 1510 and the LED 1520. The device is activated by a switch 1430. It should be appreciated that these exemplary circuit diagrams are not limiting and that various other circuitry embodiments may be provided with the device of this invention.

While this invention has been described in conjunction with specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention. For example, while exemplary embodiments are taught to be useful as a book light or music stand light, various other task lighting can be achieved by this invention, including, but not limited to; books, newspapers, choir books, music sheets, cars interiors (e.g. to read maps, etc.), cross-stitching, painting, home arts, music stands, sewing, sewing machines, outdoor grills, games, game boards, palm-top organizers/computers, computer keyboards, remote control devices, handheld computer games (e.g. GameBoy™, etc.), calculators, any unlit LCD or computer panel and camping (tents, etc.), etc.

What is claimed is:

1. A portable reading light device comprising:
   a base portion; having a clasping device for releasably attaching to a surface;
   a power source contained on the reading light;
   a neck portion attached to the base portion, and
   a thin illumination panel affixed to the neck portion and electrically connected to the power source, wherein the illumination panel has an electroluminescent light source that produces a diffuse light,
   the neck portion is flexible to allow the illumination panel to be placed in various positions relative to the base portion.

2. The reading light of claim 1, wherein the clasping device is adjustable for attaching the reading light to a surface.

3. The reading light of claim 1, further comprising an electrical connector that allows power to be drawn from an external source.

4. The reading light of claim 1, wherein the illumination panel has a thickness within the range of 1 mm and 10 mm.

5. The reading light of claim 1, wherein the reading light is a book light.

6. The reading light of claim 1, wherein the electroluminescent light source is adjustable to vary the brightness of light emitted.

7. A reading light device, comprising:
   a base portion having an electrical connector, the electrical connector releasably attaching to-an external power source;
   a neck portion attached to the base portion;
   a light source contained on the reading light;
   an illumination panel affixed to the neck portion and optically connected to the light source, wherein the illumination panel is a thin member having a thickness within the range of 1 mm and 10 mm and the illumination panel has a light guide that produces a diffuse light,
   the neck portion is flexible to allow the illumination panel to be placed in various positions relative to the base portion.

8. The reading light of claim 7, wherein the light guide is a fiber optic panel.

9. The reading light of claim 8, wherein the light guide is formed from at least one polymer panel having at least one reflective surface.

10. The reading light of claim 7, further comprising an adjustable clamp for attaching the illumination device to a surface.

11. The reading light of claim 7, wherein the neck portion further comprises at least one telescoping member.

12. The reading light of claim 7, wherein the reading light is a book light.

13. The reading light of claim 7, wherein the light guide is adjustable to vary the brightness of the light emitted.

14. A portable reading light device, comprising:
   a base portion;
   a neck portion attached to the base portion;
   at least one of a power source and a light source contained on the reading light; and
   an illumination panel affixed to the neck portion, wherein the illumination panel is a thin member having a thickness within the range of 1 mm and 10 mm, and the illumination panel contain a diffuse light source;
   the neck portion is flexible to allow the illumination panel to be placed in various positions relative to the base portion; wherein the diffuse light is produced by one of an electro-luminescent light source and a light guide.

15. The reading light of claim 14, wherein the illumination panel is quadralateral in shape.

16. The reading light of claim 14, wherein the clasping device is adjustable for attaching the illumination device to a surface.

17. The reading light of claim 14, further comprising an electrical connector that allows power to be drawn from an external source.

18. The reading light of claim 14, wherein the neck portion further comprises at least one telescoping member.

19. The reading light of claim 14, wherein the base portion is a book cover.

20. The reading light of claim 14, wherein the base portion is a tablet.

21. The reading light of claim 14, wherein the diffuse light source is adjustable to vary the brightness of light emitted.

22. The reading light of claim 14, wherein the reading light is a book light.

23. A portable reading light device comprising:
   a base portion;
   a power source contained on the reading light;
   an adjustably positional neck portion attached to the base portion; and
   an illumination panel affixed to the neck portion; wherein the illumination panel is a thin member that provides a diffuse light; wherein the diffuse light is produced by one of an electro-luminescent light source and a light guide.

24. The portable reading light according to claim 23, wherein the thin member has a thickness of between about 1 millimeter and about 10 millimeters.

25. The portable reading light according to claim 23, wherein the base portion has a clasping device for attaching to a surface.

26. The portable reading light according to claim 23, wherein the neck portion has at least one hinge to allow the illumination panel to be rotated about at least one axis.

27. The portable reading light according to claim 23, wherein the neck portion further comprises at least one telescoping member.

28. The portable reading light according to claim 23, wherein the diffuse light is adjustable to vary the brightness of light emitted.

29. The portable reading light according to claim 23, wherein the portable reading light is a book light.

* * * * *

UNITED STATES PATENT AND TRADEMARK OFFICE
CERTIFICATE OF CORRECTION

PATENT NO. : 6,666,563 B2
DATED : December 23, 2003
INVENTOR(S) : Dahvid Brown

It is certified that error appears in the above-identified patent and that said Letters Patent is hereby corrected as shown below:

Title page,
Item [57], ABSTRACT,
Line 3, after "panel" insert -- . The illumination panel --.

Drawings,
Please add FIGS. 14-15, as shown on the attached pages.

Signed and Sealed this

Twenty-fourth Day of August, 2004

JON W. DUDAS
*Director of the United States Patent and Trademark Office*